(12) United States Patent
Chu et al.

(10) Patent No.: US 9,102,827 B2
(45) Date of Patent: Aug. 11, 2015

(54) THERMOPLASTIC RESIN HAVING HIGH TRANSPARENCY AND HIGH IMPACT STRENGTH AND PREVENTING LOW-TEMPERATURE WHITENING

(71) Applicant: Cheil Industries Inc., Gumi-si (KR)

(72) Inventors: Dong Hui Chu, Uiwang-si (KR); Doo Han Ha, Uiwang-si (KR); In Chol Kim, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 139 days.

(21) Appl. No.: 13/866,306

(22) Filed: Apr. 19, 2013

(65) Prior Publication Data

US 2014/0142212 A1 May 22, 2014

Related U.S. Application Data

(63) Continuation-in-part of application No. PCT/KR2010/008312, filed on Nov. 24, 2010.

(30) Foreign Application Priority Data

Oct. 20, 2010 (KR) .................. 10-2010-0102171

(51) Int. Cl.
| | |
|---|---|
| *C08L 33/12* | (2006.01) |
| *C08L 33/08* | (2006.01) |
| *C08L 51/06* | (2006.01) |
| *C08L 33/10* | (2006.01) |
| *C08G 77/04* | (2006.01) |
| *C08L 83/00* | (2006.01) |

(52) U.S. Cl.
CPC ................. *C08L 33/12* (2013.01); *C08L 33/08* (2013.01); *C08L 33/10* (2013.01); *C08L 51/06* (2013.01); *C08G 77/04* (2013.01); *C08L 83/00* (2013.01); *C08L 2205/02* (2013.01)

(58) Field of Classification Search
CPC ......... C08G 77/04; C08L 33/08; C08L 33/12; C08L 33/18; C08L 83/00; C08L 83/04; C08L 51/06; C08L 2205/02
USPC .................................................. 523/122, 201
See application file for complete search history.

(56) References Cited

U.S. PATENT DOCUMENTS

2008/0302479 A1* 12/2008 Barker et al. .............. 156/331.7

FOREIGN PATENT DOCUMENTS

| | | |
|---|---|---|
| KR | 10-2003-0005981 A | 1/2003 |
| KR | 10-2003-0034405 A | 5/2003 |
| KR | 10-2003-0055445 A | 7/2003 |
| KR | 10-2007-0064925 A | 6/2007 |
| KR | 10-2010-0045927 A | 5/2010 |
| WO | 2012/053693 A1 | 4/2012 |

OTHER PUBLICATIONS

International Search Report in counterpart International Application No. PCT/KR2010/008312 dated Nov. 15, 2011, pp. 1-4.

* cited by examiner

*Primary Examiner* — Kriellion Sanders
(74) *Attorney, Agent, or Firm* — Additon, Higgins & Pendleton, P.A.

(57) ABSTRACT

A transparent thermoplastic resin composition includes (A) a methylmethacrylate-styrene-acrylonitrile-butadiene copolymer (g-MABS) which is a graft resin having a core-shell structure and including butadiene with an average particle size of about 700 to about 1800 Å; (B) a methylmethacrylate-styrene-acrylonitrile-butadiene copolymer (g-MABS) which is a graft resin having a core-shell structure and including butadiene with an average particle size of about 2000 to about 4000 Å; (C) dimethyl polysiloxane; and (D) a base resin which includes (meth)acrylic acid alkyl ester in an amount of about 40 to about 100% by weight.

8 Claims, No Drawings

THERMOPLASTIC RESIN HAVING HIGH TRANSPARENCY AND HIGH IMPACT STRENGTH AND PREVENTING LOW-TEMPERATURE WHITENING

CROSS-REFERENCE TO RELATED APPLICATIONS

This application is a continuation-in-part of International Application No. PCT/KR2010/008312, filed Nov. 24, 2010, which designates the U.S., published as WO 2012/053693, and is incorporated herein by reference in its entirety, and claims priority therefrom under 35 USC Section 120. This application also claims priority under 35 USC Section 119 from Korean Patent Application No. 10-2010-0102171, filed Oct. 20, 2010, the entire disclosure of which is also incorporated herein by reference.

FIELD OF THE INVENTION

The present invention relates to a thermoplastic resin that can have high transparency and can minimize and/or prevent whitening even when left under low temperature conditions.

BACKGROUND OF THE INVENTION

Generally, acrylonitrile-butadiene rubber-styrene (ABS) resin has excellent impact strength and processability as well as good mechanical strength, thermal deformation temperature, and gloss. Thus ABS resins are widely used in electrical and electronic components, office equipment and the like.

However, ABS resin used in the housings of the high-end home appliances such as LCDs, PDPs, TVs, and audio components can be easily scratched. Also it can be difficult to obtain a desired color and/or texture, which can reduce the product value.

To resolve these problems, the surfaces of ABS injection molding products can be coated with urethane paint, UV coating, or acrylic resin coating having high scratch resistance. However, these coatings are associated with additional complicated processing steps, which can increase defects, and which ultimately can reduce productivity due to the addition of the post processing steps. In addition, environmental pollution problems caused by the coatings cannot be completely avoided.

Therefore, there is a demand for a non-coated resin that can be prepared without a post processing step and can have good transparency and coloring properties to realize a high gloss color feeling.

Methyl methacrylate-acrylonitrile-butadiene-styrene (MABS)/polymethylmethacrylate (PMMA) materials can be used to produce luxury designs in housings of home appliances, such as TVs and monitors. Recently, the use of semi-transparent materials has expanded according to market trends. Further, with increasing design intricacies, the demand for high impact and high fluidity is also increasing.

In MABS/PMMA compositions, silicone-type impact reinforcing materials can be used to increase impact strength. In the case of semi-transparent materials, coloring agents can be added in minute quantities, which can lower the hiding power of color. Consequently, problems can occur due to whitening of the product surface when an injection molding product is left at a temperature of less than −30° C.

A g-MABS impact reinforcing material can be added to the composition in excess, instead of silicone-type impact reinforcing materials. However, this method can impair the impact reinforcing effect. Moreover, if an impact reinforcing material with a particle size more than 3000 Å is used, low temperature whitening can occur.

In addition, this method not only can cause low temperature whitening but can reduce the fluidity of the resin, which can reduce formability, and can also increase gas generation.

SUMMARY OF THE INVENTION

The present invention is directed to a resin composition including rubber-modified impact reinforcing materials, wherein the rubber particle sizes of the impact reinforcing materials are adjusted. The composition can exhibit high fluidity, and/or high impact strength, and/or minimal or no whitening under low temperature conditions, for example, a low temperature of less than about −30° C. The resin composition can also have improved formability and/or transparency.

In exemplary embodiments, the present invention can include a transparent thermoplastic resin composition comprising:

(A) methyl methacrylate-styrene-acrylonitrile-butadiene copolymer (g-MABS) which is a graft resin with a core-shell structure including butadiene particles having an average particle size of about 700 to about 1800 Å; (B) methyl methacrylate-styrene-acrylonitrile-butadiene copolymer (g-MABS) which is a graft resin with a core-shell structure including butadiene particles having an average particle size of about 2000 to about 4000 Å; (C) dimethyl polysiloxane; and (D) a base resin comprising (meth)acrylic acid alkyl ester component in an amount of about 40 to about 100% by weight. In exemplary embodiments of the present invention, a transparent thermoplastic resin composition comprises (A) methyl methacrylate-styrene-acrylonitrile-butadiene copolymer (g-MABS) MABS) which is a graft resin with a core-shell structure including butadiene particles with an average particle size of about 700 to about 1800 Å in an amount of about 30 to about 40% by weight; (B) methyl methacrylate-styrene-acrylonitrile-butadiene copolymer (g-MABS) which is a graft resin with a core-shell structure including butadiene with an average particle size of about 2000 to about 4000 Å in an amount of about 1 to about 6% by weight; (C) dimethyl polysiloxane in an amount of about 0.002 to about 0.01% by weight; and (D) a base resin which includes about 40 to about 100% by weight of (meth)acrylic acid alkyl ester component in an amount of about 54 to about 68% by weight, wherein the amounts of each of (A), (B), (C), and (D) is based on the total amount (100% by weight) of (A), (B), (C), and (D).

The core-shell structured graft resin of (A) and (B) can include a double shell including a first inner shell and a second outer shell. The first inner shell can be formed of a styrene-acrylonitrile resin, and the second outer shell can be formed of polymethylmethacrylate (PMMA) resin. The core can include butadiene rubber and/or butadiene-styrene rubber copolymer.

The methylmethacrylate-styrene-acrylonitrile-butadiene copolymer (A) and/or (B) which is a graft resin having a core-shell structure can include a butadiene rubber in an amount of about 30 to about 70 parts by weight, methylmethacrylate in an amount of about 15 to about 55 parts by weight, acrylonitrile in an amount of about 1 to about 5 parts by weight, and styrene in an amount of about 5 to about 35 parts by weight.

The base resin (D) comprising the (meth)acrylic acid alkyl ester component in an amount about 40 to about 100% by weight can include polymethylmethacrylate resin (PMMA), methylmethacrylate-styrene-acrylonitrile (MSAN) resin or a combination thereof Examples of the methylmethacrylatestyrene-acrylonitrile (MSAN) resin can include a methylmethacrylate-styrene-acrylonitrile (MSAN) with a fluidity index of about 10, a methylmethacrylate-styrene-acrylonitrile (MSAN) with a fluidity index of about 25, or a combination thereof, wherein the fluidity of a 10 kg specimen is measured at 220° C. in accordance with the method specified in ISO1103.

The transparent thermoplastic resin composition can further include one or more additives selected from a group consisting of pigments, dyes, flame retardants, fillers, stabilizers, lubricants, antimicrobial agents, releasing agents, and combinations thereof.

DETAILED DESCRIPTION OF THE INVENTION

The present invention now will be described more fully hereinafter in the following detailed description of the invention in which some but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention relates to a transparent thermoplastic resin composition comprising (A) methyl methacrylate-styrene-acrylonitrile-butadiene copolymer (g-MABS) which is a graft resin with a core-shell structure including butadiene particles with an average particle size of about 700 to about 1800 Å; (B) methyl methacryate-styrene-acrylonitrile-butadiene copolymer (g-MABS) which is a graft resin with a core-shell structure including butadiene particles with an average particle size of about 2000 to about 4000 Å; (C) dimethyl polysiloxane; and (D) a resin comprising (meth) acrylic acid alkyl ester component in an amount of about 40 to about 100% by weight. The compositional elements are explained as below in detail.

For ease of discussion, graft copolymers (A) and (B) are referred to herein as methyl methacrylate-styrene-acrylonitrile-butadiene copolymer (g-MABS) graft resins (A) and (B). The skilled artisan will appreciate, however, that the graft copolymers can include different compounds graft polymerized to the rubber core, for example one or more compounds in addition to or in place of one or more of methyl methacrylate, acrylonitrile and/or styrene. Accordingly, the graft copolymers (A) and (B) are not limited to graft copolymers with these specific grafting compounds.

As used herein, average particle size refers to the particle size which is measured based on the extent of light scattering, which can be determined using techniques known in the art. Butadiene rubber particles having an average particle size as discussed herein are commercially available.

(A) Methyl methacrylate-styrene-acrylonitrile-butadiene copolymer (g-MABS) graft resin having a core-shell structure including butadiene rubber with a small particle size.

The methyl methacrylate-styrene-acrylonitrile-butadiene copolymer (g-MABS) is a graft resin having a core-shell structure, wherein the core comprises a butadiene rubber. As used herein, the term butadiene rubber refers to butadiene rubber and/or butadiene-styrene rubber polymer.

Examples of compounds that can be used to form the shell can include without limitation aromatic vinyl compounds, such as styrene, α-methylstyrene, and/or halogen and/or $C_1$-$C_{10}$ alkyl substituted styrene, $C_1$-$C_8$ methacrylic acid alkyl esters, $C_1$-$C_8$ acrylic acid alkyl esters, unsaturated nitriles such as acrylonitrile and/or methacrylonitrile, maleic anhydride, $C_1$-$C_4$ alkyl and/or phenyl N-substituted maleimides, copolymers thereof, and the like, and combinations thereof.

In one embodiment of the present invention, the shell is a double shell including a first inner shell and a second outer shell. The first inner shell is an inner shell which can be beneficial for impact resistance, and the second shell is an outer shell which can be beneficial for scratch resistance.

Examples of compounds that can be used to form the first inner shell can include without limitation aromatic vinyl compounds, such as styrene, α-methylstyrene, and/or halogen and/or $C_1$-$C_{10}$ alkyl substituted styrene, $C_1$-$C_8$ methacrylic acid alkyl esters, $C_1$-$C_8$ acrylic acid alkyl esters, unsaturated nitriles such as acrylonitrile and/or methacrylonitrile, maleic anhydride, $C_1$-$C_4$ alkyl and/or phenyl N-substituted maleimides, copolymers thereof, and the like, and combinations thereof. Examples of compounds that can be used to form the second outer shell can include without limitation $C_1$-$C_8$ methacrylic acid alkyl esters, $C_1$-$C_8$ acrylic acid alkyl esters, and combinations thereof. In another embodiment of the present invention, examples of compounds that can be used to form the second outer shell can include without limitation aromatic vinyl compounds, such as styrene, α-methylstyrene, and/or halogen and/or $C_1$-$C_{10}$ alkyl substituted styrene, unsaturated nitriles such as acrylonitrile and/or methacrylonitrile, maleic anhydride, $C_1$-$C_4$ alkyl and/or phenyl N-substituted maleimides, $C_1$-$C_8$ methacrylic acid alkyl esters, $C_1$-$C_8$ acrylic acid alkyl ester, copolymers thereof, and the like, and combinations thereof.

In one embodiment of the present invention, the first inner shell is a styrene-acrylonitrile resin, and the second outer shell is polymethylmethacrylate (PMMA) resin.

In another embodiment of the present invention, the first inner shell and the second outer shell are both formed of a methylmethacrylate-acrylonitrile-styrene copolymer.

The graft resin having a core-shell structure in accordance with the present invention can be prepared as follows.

One embodiment of the present invention includes a first method in which one or more compounds are grafted on the surface of rubber to form a first inner shell and in which one or monomers are polymerized to form a second outer shell on the first shell, wherein the monomer composition of the first shell is different from the monomer composition of the second shell. The first method results in a core-shell structured resin. The first method includes a first polymerization stage, wherein suitable compounds such as aromatic vinyl monomer and/or unsaturated nitrile monomer are graft polymerized to the surface of the rubber to form an inner shell; and thereafter a second polymerization stage, wherein an outer shell is formed to enclose the inner shell by adding a different monomer composition, such as (meth)acrylic acid alkyl ester monomer. The first polymerization stage can use a fat soluble redox series initiator system, and the second polymerization stage can use a water soluble initiator. The resultant core-shell graft resin (A) after the second stage can be prepared into powder form using post processing steps, such as of solidification, washing, dehydration, and the like.

A second method is a method by which a grafted shell layer on the rubber surface is made as double layer but with the same monomer composition in each layer. This second method includes a first polymerization stage during which a first graft reaction is performed by adding part of one or more monomers, such as a mixture of (meth)acrylic acid alkyl ester monomer, aromatic vinyl monomer, and unsaturated nitrile monomer (which are the graft monomers), and a second stage during which a second graft reaction is performed by adding the remaining graft monomer mixture to prepare a graft resin with core-shell structure. The first polymerization stage can use a fat soluble redox series initiator system and the second polymerization stage can use a water soluble initiator system. The resultant core-shell graft resin (A) after the second stage polymerization can be made into a powder form using post-processing steps such as solidification, washing, dehydration, and the like.

Examples of the aromatic vinyl monomer can include without limitation styrene, α-methyl styrene, halogen and/or $C_1$-$C_{10}$ alkyl substituted styrene, and the like, and combinations thereof.

Examples of the unsaturated nitrile monomers can include without limitation acrylonitrile, methacrylonitrile, and the like, and combinations thereof.

In addition, maleic acid anhydride, $C_1$-$C_4$ alkyl and/or phenyl N-substituted maleimides, $C_1$-$C_8$ methacrylic acid alkyl esters, $C_1$-$C_8$ acrylic acid alkyl ester, and the like, and combinations thereof can be used (also in combination with the aromatic vinyl monomers and/or unsaturated nitrile monomers).

The core-shell structured graft resin prepared by the two methods can improve the colorability by making the refractive index of rubber of the core layer and the refractive index of the graft MSAN of the shell layers similar or the same. Also, the methods can allow control of polymerization conditions so that an acrylate monomer (such as methylmethacrylate monomer) of the graft g-MSAN resins can be positioned at the end of the MSAN chain, which can help minimize reduction of scratch resistance. This can also help minimize reduction of weather resistance by including an acrylate monomer (such as methylmethacrylate) at the outermost edge of a rubber surface.

The methylmethacrylate-styrene-acrylonitrile-butadiene graft copolymer resins (A) and/or (B) with a core-shell structure can include butadiene rubber in an amount of about 30 to about 70 parts by weight, $C_1$-$C_8$ (meth)acrylic acid alkyl ester such as methylmethacrylate in an amount of about 15 to about 55 parts by weight, unsaturated nitrile monomer such as acrylonitrile in an amount of about 1 to about 5 parts by weight, and aromatic vinyl monomer such as styrene in an amount of about 5 to about 35 parts by weight.

In some embodiments, the methylmethacrylate-styrene-acrylonitrile-butadiene graft copolymer resins (A) and/or (B) can include butadiene rubber in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 parts by weight, based on the total weight of the compounds used to make the graft copolymer resins (A) and/or (B). Further, according to some embodiments of the present invention, the butadiene rubber may be present in an amount of from about any of the foregoing amounts to about any other of the foregoing amounts.

In some embodiments, the methylmethacrylate-styrene-acrylonitrile-butadiene graft copolymer resins (A) and/or (B) can include $C_1$-$C_8$ (meth)acrylic acid alkyl ester such as methylmethacrylate in an amount of about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, or 55 parts by weight, based on the total weight of the compounds used to make the graft copolymer resins (A) and/or (B). Further, according to some embodiments of the present invention, the $C_1$-$C_8$ (meth)acrylic acid alkyl ester such as methylmethacrylate may be present in an amount of from about any of the foregoing amounts to about any other of the foregoing amounts.

In some embodiments, the methylmethacrylate-styrene-acrylonitrile-butadiene graft copolymer resins (A) and/or (B) can include unsaturated nitrile monomer such as acrylonitrile in an amount of about 1, 2, 3, 4, or 5 parts by weight, based on the total weight of the compounds used to make the graft copolymer resins (A) and/or (B). Further, according to some embodiments of the present invention, the unsaturated nitrile monomer such as acrylonitrile may be present in an amount of from about any of the foregoing amounts to about any other of the foregoing amounts.

In some embodiments, the methylmethacrylate-styrene-acrylonitrile-butadiene graft copolymer resins (A) and (B) can include aromatic vinyl monomer such as styrene in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35 parts by weight, based on the total weight of the compounds used to make the graft copolymer resins (A) and/or (B). Further, according to some embodiments of the present invention, the aromatic vinyl monomer such as styrene may be present in an amount of from about any of the foregoing amounts to about any other of the foregoing amounts.

If g-MABS resin is made by the first method, the amount of polybutadiene and/or butadiene-styrene rubber latex can be adjusted to about 30 to about 70% by weight (solid component). After that the first inner shell can be formed using acrylonitrile and styrene monomer, followed by the second graft polymerization during which an outer shell is formed by enclosing the first inner shell with methyl methacrylate monomer. At this time, the graft monomer composition has the same refractive index of the rubber for emulsified polymerization. Finally, this polymer can be solidified, dehydrated, and dried to obtain g-MABS resin in a fine powder form.

If g-MABS resin is made by the second method, the amount of polybutadiene and/or butadiene-styrene rubber latex can be adjusted to about 30 to about 70% by weight (solid component). Then, methylmethacrylate-acrylonitrile-styrene monomers can be emulsion graft polymerized to the rubber in two steps to form the two layer shell structure in which both the inner and outer shell are formed of the same monomers. The resultant polymer can be solidified, dehydrated, and dried to obtain g-MABS resin in fine powder form.

(B) Methylmethacrylate-styrene-acrylonitrile-butadiene copolymer (g-MABS) graft resin having a core-shell structure comprising butadiene rubber with a large particle size.

The g-MABS (B) includes the same compositional elements as the g-MABS (A) except for the particle size of butadiene rubber.

In accordance with the present invention, the thermoplastic resin composition includes g-MABS (A) including a butadiene rubber with a relatively small average butadiene rubber particle size and g-MABS (B) including a butadiene rubber with a relatively large average butadiene rubber particle size as compared to the butadiene rubber particle size of g-MABS (A). The combination of g-MABS (A) and (B) with small and large butadiene rubber particle sizes can provide high transparency, enhance impact strength and/or minimize low temperature whitening of the transparent thermoplastic resin composition.

In exemplary embodiments of the present invention, the average diameter of the butadiene rubber of g-MABS (A) having a small particle size can be about 700 to about 1800 Å, for example about 1200 to about 1700 Å.

In exemplary embodiments of the present invention, the average diameter of the butadiene rubber of g-MABS (B) having a large particle size can be about 2000 to about 4000 Å, for example about 2300 to about 3000 Å. If the average diameter of the butadiene rubber of the g-MABS (A) having a small particle size becomes too large, then transparency and gloss can be reduced. If the average diameter of the butadiene rubber of the g-MABS (A) having a small particle size is too small, the impact strength can be reduced. Also, if the average diameter of the rubber particles of the g-MABS (B) having a large average particle size become too large or too small, this too can decrease impact strength.

The graft ratio of graft resins (A) and/or (B) having a core-shell structure can be about 30 to about 70%.

(C) Dimethyl Polysiloxane

The dimethyl polysiloxane can be an oil type siloxane and can be used as a reinforcing material against impact. The viscosity of the dimethyl polysiloxane can be about 90 to about 100 cp. Dimethyl polysiloxanes are known on the art and are commercially available.

The methylmethacrylate-styrene-acrylonitrile-butadiene copolymer (g-MABS) plays a role in preventing the whitening on the product surface when it is left at a low temperature. However, when only a g-MABS (A) comprising a butadiene rubber with a small particle size is used, the impact strength of product can decrease. Therefore, the impact strength can be enhanced by adding a dimethyl polysiloxane (C) which is a kind of siloxane. Moreover, g-MABS (B) comprising a butadiene rubber with a large particle size is added to further improve the impact strength. g-MABS (B) comprising a butadiene rubber having a large particle size can play an auxiliary role with dimethyl polysiloxane (C) to improve impact strength. Thus, g-MABS (B) comprising a butadiene rubber with a large particle size and dimethyl polysiloxane are essential components of the composition to achieve improved impact strength in accordance with the present invention. If only one of the dimethyl polysiloxane or g-MABS (B) comprising a butadiene rubber having a large particle size is added, the effect of improvement on the impact strength cannot be achieved.

The transparent thermoplastic resin composition of the invention can include the g-MABS (A) comprising butadiene rubber having a small average particle size in an amount of about 30% by weight or more to achieve improved impact resistance and/or whitening prevention. The transparent thermoplastic resin composition of the invention can include the g-MABS (B) comprising butadiene rubber having a large average particle size in an amount of about 6% by weight or less. Further, the transparent thermoplastic resin composition of the invention can include the dimethyl polysiloxane (C) in an amount of about 0.01% by weight or less.

When the amount of g-MABS (A) comprising butadiene rubber having a small average particle size is less than about 30% by weight, the low temperature whitening of product may not be prevented. When the amount of g-MABS (B) comprising butadiene rubber having a large average particle size is greater than about 6% by weight and the amount of dimethyl polysiloxane (C) is greater than about 0.01% by weight, both impact strength and prevention of the low temperature whitening may not be achieved. For example, if dimethyl polysiloxane (C) is added in an amount above about 0.01% by weight, the low temperature whitening can be prominently apparent. Thus, the amount of g-MABS (A) comprising butadiene rubber having a small average particle size has a meaning at a lower limit while the amounts of g-MABS (A) comprising butadiene rubber having a large average particle size and dimethyl polysiloxane (C) have a meaning at a higher limit.

(D) Base resin comprising a (meth)acrylic acid alkyl ester in an amount of about 40 to about 100% by weight In accordance with the present invention, the composition includes a base resin (D) comprising a (meth)acrylic acid alkyl ester component in an amount of about 40 to about 100% by weight, based on the total amount (100% by weight) of the base resin (D). In some embodiments, the base resin (D) can include the (meth)acrylic acid alkyl ester component in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100% by weight. Further, according to some embodiments of the present invention, the (meth)acrylic acid alkyl ester component may be present in an amount of from about any of the foregoing amounts to about any other of the foregoing amounts.

Examples of the (meth)acrylic acid alkyl ester can include without limitation polymethyl methacrylate resin (PMMA), methyl methacrylate-styrene-acrylonitrile (MSAN) resins, and the like, and combinations thereof.

In exemplary embodiments, the base resin (D) can include methyl methacrylate-styrene-acrylonitrile (MSAN) with a fluidity index of about 10, a methyl methacrylate-styrene-acrylonitrile (MSAN) with a fluidity index about 25, or a combination thereof. The fluidity index is measured using a 10 kg specimen at 220° C. in accordance with ISO1103, unless defined otherwise herein.

The transparent thermoplastic resin composition of the present invention can include about 30 to about 40% by weight (A) methylmethacrylate-styrene-acrylonitrile-butadiene (g-MABS) graft copolymer resin with a core-shell structure and including butadiene rubber with an average particle size of about 700 to about 1800 Å;

about 1 to about 6% by weight (B) methylmethacrylate-styrene-acrylonitrile-butadiene (g-MABS) graft copolymer resin with a core-shell structure and including butadiene rubber with an average particle size of about 2000 to about 4000 Å;

about 0.002 to about 0.01% by weight (C) dimethyl polysiloxane; and about 54 to about 68% by weight (D) base resin which includes about 40 to about 100% by weight of (meth)acrylic acid alkyl ester component, wherein the amounts of each of (A), (B), (C), and (D) are based on the total amount (100% by weight) of (A), (B), (C), and (D).

In some embodiments, the transparent thermoplastic resin composition can include the g-MABS graft copolymer resin (A) in an amount of about 30, 31, 32, 33, 34, 35, 36, 37, 38, 39, or 40% by weight. Further, according to some embodiments of the present invention, the g-MABS graft copolymer resin (A) may be present in an amount of from about any of the foregoing amounts to about any other of the foregoing amounts.

In some embodiments, the transparent thermoplastic resin composition can include the g-MABS graft copolymer resin (B) in an amount of about 1, 2, 3, 4, 5, or 6% by weight. Further, according to some embodiments of the present invention, the g-MABS graft copolymer resin (B) may be present in an amount of from about any of the foregoing amounts to about any other of the foregoing amounts.

In some embodiments, the transparent thermoplastic resin composition can include the dimethyl polysiloxane (C) in an amount of about 0.002, 0.003, 0.004, 0.005, 0.006, 0.007, 0.008, 0.009, or 0.01% by weight. Further, according to some embodiments of the present invention, the dimethyl polysiloxane (C) may be present in an amount of from about any of the foregoing amounts to about any other of the foregoing amounts.

In some embodiments, the transparent thermoplastic resin composition can include the base resin (D) in an amount of about 54, 55, 56, 57, 58, 59, 60, 61, 62, 63, 64, 65, 66, 67, or 68% by weight. Further, according to some embodiments of the present invention, the base resin (D) may be present in an amount of from about any of the foregoing amounts to about any other of the foregoing amounts.

In exemplary embodiments of the present invention, the transparent thermoplastic resin composition can optionally include one or more additives. Examples of the additives can include without limitation dyes, pigments, flame retardants, fillers, stabilizers, lubricants, antimicrobials, releasing agents, and the like, and combinations thereof. The additives can be used in conventional amounts.

The present invention can be better understood by the examples described below. The following examples are merely for the purpose of exemplifying the present invention and not intended to limit the scope of protection of the attached patent claims.

EXAMPLES OF THE PRESENT INVENTION

Examples

Examples 1 to 5

The compositional ingredients as in Table 1 are sufficiently mixed with small tumbler mixer for evenly mixing the ingredients. The mixed mass is extruded with twin screw extruder having a diameter $\phi=45$ mm and a temperature of 220 to 240° C., cooled, and solidified to obtain a pellet shaped composition. The pellets are dried under circulated heat dryer in which a temperature of 80° C. is maintained for four hours. Dried pellets are processed with a 120 ton capacity injection molding machine while changing the injection molding temperature from 220 to 240° C. with a mold temperature of 65° C. to prepare the test specimen for examining the general physical properties of thermoplastic resin composition. A colorchip specimen is also prepared to check the transparency, colorability (blackness), and the scratch resistance. In addition, the melt flow index is measured to evaluate the formability.

The prepared specimens are left for 24 hours and then the impact resistance, fluidity, and low temperature whitening are measured. The results are indicated in Table 1.

[Testing Methods]
(1) Impact Strength (kgf cm/cm)
Impact strength is measured for a specimen having a thickness of ⅛" in accordance with ASTM D256.
(2) Fluidity (g/10 min)
The fluidity (melt index) of a 10 kg specimen is measured at 220° C. in accordance with ISO1103.
(3) Low Temperature Whitening
The appearance of a specimen is examined after the specimen (size 10×10 mm and thickness 3 to 4 T) is left inside a chamber at a temperature −30° C. for 12 hours.

Comparative Examples

Comparative Example 1

Comparative Example 1 is made using the same method of Example 1 except that dimethyl polysiloxane (S50) is not added.

Comparative Example 2

Comparative Example 2 is made using the same method as Example 1 except that dimethyl polysiloxane (S50) is added in an amount of 0.02% by weight.

Comparative Examples 3 and 4

Comparative Examples 3 and 4 are made using the same method as Example 1 except g-MABS (CHCS) including butadiene with an average particle size of 1500 Å is added in an amount of less than 30% by weight and low fluidity MSAN (AP-CH) is added in a larger amount than g-MABS.

Comparative Example 5

Comparative Example 5 is made using the same method as Example 1 except that g-MABS (CHCM) including butadiene with an average particle size of 2500 Å is added in an amount more than 6% by weight and low fluidity MSAN (AP-CH) is added in a smaller amount than g-MABS.

Comparative Example 6

Comparative Example 6 is made using the same method as Example 3 except that g-MABS (CHCM) including butadiene with an average particle size of 2500 Å is added in an amount more than 6% by weight and low fluidity MSAN (AP-CH) is added in smaller amount than g-MABS.

Comparative Example 7

Comparative Example 7 is made using the same method as Example 1 except that g-MABS (CHCM) including butadiene with an average particle size of 2500 Å is added in an amount of 30% by weight and g-MABS (CHCS) including butadiene with an average particle size of 1500 Å is not added.

Comparative Example 8

Comparative Example 8 is made using the same method as Example 1 except that g-MABS (CHCS) including butadiene with an average particle size of 1500 Å is added in an amount of 30% by weight and g-MABS (CHCM) including butadiene with an average particle size of 2500 Å is not added.

TABLE 1

| | Examples | | | | | Comparative examples | | | | | | | |
|---|---|---|---|---|---|---|---|---|---|---|---|---|---|
| | 1 | 2 | 3 | 4 | 5 | 1 | 2 | 3 | 4 | 5 | 6 | 7 | 8 |
| CHCM | 3 | 6 | 3 | 6 | 3 | 3 | 3 | 3 | 3 | 9 | 9 | 30 | — |
| CHCS | 30 | 30 | 33 | 33 | 30 | 30 | 30 | 27 | 24 | 30 | 33 | — | 30 |
| AP-CH | 27 | 24 | 24 | 21 | 27 | 27 | 27 | 30 | 33 | 21 | 18 | 30 | 30 |
| CM-5100 | 40 | 40 | 40 | 40 | 40 | 40 | 40 | 40 | 40 | 40 | 40 | 40 | 40 |
| S50 | 0.01 | 0.01 | 0.01 | 0.01 | 0.002 | — | 0.02 | 0.01 | 0.01 | 0.01 | 0.01 | 0.01 | 0.01 |

TABLE 1-continued

|  | Examples | | | | | Comparative examples | | | | | | | |
| --- | --- | --- | --- | --- | --- | --- | --- | --- | --- | --- | --- | --- | --- |
|  | 1 | 2 | 3 | 4 | 5 | 1 | 2 | 3 | 4 | 5 | 6 | 7 | 8 |
| IZOD impact strength (kgf · cm/cm) | 11 | 13 | 17 | 18 | 10 | 5 | 12 | 9 | 8 | 17 | 19 | 21 | 6 |
| Melt index (MI) (g/10 min) | 18 | 16 | 14 | 12 | 17 | 18 | 18 | 19 | 19 | 10 | 9 | 15 | 19 |
| Low temperature whitening | X | X | X | X | X | X | ◉ | O | O | O | O | O | X |

(◉: severe whitening, O: whitening occurred, X: whitening not occurred)
\*\*CHCM: Methylmethacrylate-styrene-acrylonitrile-butadiene copolymer (g-MABS), which is core-shell structured graft resin including butadiene with an average particle size of 2500 Å manufactured by Cheil Industries (Co. Ltd.).
\*\*CHCS: Methylmethacrylate-styrene-acrylonitrile-butadiene copolymer (g-MABS), which is core-shell structured graft resin including butadiene with an average particle size of 1500 Å manufactured by Cheil Industries (Co. Ltd.).
\*\*AP-CH: Methylmethacrylate-styrene-acrylonitrile (MSAN) manufactured by Cheil Industries (Co. Ltd.), having a melt flow index of 10 when measured at 220° C. using a 10 kg of specimen in accordance with ISO1103.
\*\*CM-5100: Methylmethacrylate-styrene-acrylonitrile (MSAN) manufactured by Cheil Industries (Co. Ltd.), having a melt flow index of 25 when measured at 220° C. using a 10 kg of specimen in accordance with ISO1103.
\*\*S50: Dimethyl polysiloxane manufactured by Nippon Unicar.
\*\*Unit: % by weight As can be seen from Table 1, impact strength is significantly reduced in Comparative Example 1 which does not include dimethyl polysiloxane, as compared with Example 1 which includes dimethyl polysiloxane. Also, in Comparative Example 2, when dimethyl polysiloxane is added in an amount outside of the range of the present invention (0.02% by weight), low temperature whitening which is white cloudy phenomena is clearly apparent. When the g-MABS including butadiene with an average particle size of 1500 Å is added in an amount less than 30% by weight, the low temperature whitening occurs as seen in Comparative Examples 3 and 4. When g-MABS including butadiene with an average particle size of 2500 Å is added in an amount greater than 6% by weight, low temperature whitening occurs as seen in Comparative Examples 5 and 6. In Comparative Example 7, when only g-MABS including butadiene with an average particle size of 2500 Å is added and g-MABS including butadiene with an average particle size of 1500 Å is not added, though the impact strength is good, low temperature whitening occurs. This result indicates that g-MABS including butadiene with an average particle size of 1500 Å can help prevent low temperature whitening. In contrast, when only g-MABS including butadiene with an average particle size of 1500 Å is added and g-MABS including butadiene with an average particle size of 2500 Å is not added (Comparative Example 8), though the low temperature whitening did not occur, the impact strength is significantly reduced. Further, when either dimethyl polysiloxane or g-MABS including butadiene with an average particle size of 2500 Å (Comparative Example 1 and Comparative Example 8) is added, the impact strength is reduced. Therefore, the two components in combination enhance the impact strength of the resin.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A transparent thermoplastic resin composition comprising:
    (A) a methylmethacrylate-styrene-acrylonitrile-butadiene copolymer (g-MABS) graft resin with a core-shell structure, wherein the core includes butadiene with an average butadiene particle size of about 700 to about 1800 Å;
    (B) a methylmethacrylate-styrene-acrylonitrile-butadiene copolymer (g-MABS) graft resin with a core-shell structure, wherein the core includes butadiene with an average butadiene particle size of about 2000 to about 4000 Å;
    (C) a dimethyl polysiloxane; and
    (D) a base resin including (meth)acrylic acid alkyl ester in an amount of about 40 to about 100% by weight.

2. The transparent thermoplastic resin composition of claim 1, wherein the transparent thermoplastic resin composition comprises
    the methylmethacrylate-styrene-acrylonitrile-butadiene copolymer (g-MABS) graft resin (A) with a core-shell structure including butadiene with an average butadiene particle size of about 700 to about 1800 Å (A) in an amount of about 30 to about 40% by weight;
    the methylmethacrylate-styrene-acrylonitrile-butadiene copolymer (g-MABS) graft resin (B) with a core-shell structure including butadiene with an average butadiene particle size of about 2000 to about 4000 Å (B) in an amount of about 1 to about 6% by weight;
    the dimethyl polysiloxane (C) in an amount of about 0.002 to about 0.01% by weight; and
    the base resin which includes about 40 to about 100% by weight of (meth)acrylic acid alkyl ester component (D) in an amount of about 54 to about 68% by weight.

3. The transparent thermoplastic resin composition of claim 1, wherein the shell of each of the graft resins (A) and (B) has a double shell structure including a first inner shell and a second outer shell.

4. The transparent thermoplastic resin composition of claim 3, wherein the first inner shell comprises a styrene-acrylonitrile resin, the second outer shell comprises a polymethylmethacrylate (PMMA) resin, and the core comprises butadiene rubber, butadiene-styrene rubber copolymer, or a combination thereof.

5. The transparent thermoplastic resin composition of claim 1, wherein each of the graft resins (A) and (B) comprises about 30 to about 70 parts by weight of butadiene rubber, about 15 to about 55 parts by weight of methylmethacrylate, about 1 to about 5 parts by weight of acrylonitrile, and about 5 to about 35 parts by weight of styrene.

6. The transparent thermoplastic resin composition of claim 1, wherein the base resin (D) including the (meth) acrylic acid alkyl ester in an amount of about 40 to about 100% by weight comprise a polymethylmethacrylate resin (PMMA), a methylmethacrylate-styrene-acrylonitrile (MSAN) resin, or combination thereof.

7. The transparent thermoplastic resin composition of claim 6, wherein the methylmethacrylate-styrene-acrylonitrile (MSAN) resin comprises methylmethacrylate-styrene-acrylonitrile (MSAN) with a fluidity index of about 10, methylmethacrylate-styrene-acrylonitrile (MSAN) resin with a fluidity index of about 25, or combination thereof, wherein the fluidity index is measured for a 10 kg specimen at 220° C. in accordance with ISO1103.

8. The transparent thermoplastic resin composition of claim 1 wherein the transparent thermoplastic resin composition further comprises one or more additives selected from the group consisting of dyes, pigments, flame retardants, fillers, stabilizers, lubricants, antimicrobial agents, releasing agents, and combinations thereof.

* * * * *